United States Patent [19]

Galasso et al.

[11] Patent Number: 4,623,228
[45] Date of Patent: Nov. 18, 1986

[54] COMPOSITE MIRROR SUBSTRATE

[75] Inventors: Francis S. Galasso, Manchester; Karl M. Prewo, Vernon; Richard D. Veltri, East Hartford, all of Conn.

[73] Assignee: United Technologies Corporation, Hartford, Conn.

[21] Appl. No.: 664,823

[22] Filed: Oct. 25, 1984

[51] Int. Cl.⁴ .......................... G02B 5/08; G02B 5/10
[52] U.S. Cl. ..................................... 350/609; 350/320
[58] Field of Search ................................ 350/609, 641

[56] References Cited

U.S. PATENT DOCUMENTS

| | | | |
|---|---|---|---|
| 3,925,577 | 12/1975 | Fatzer et al. | 427/249 |
| 4,068,037 | 1/1978 | Debolt et al. | 428/368 |
| 4,131,697 | 12/1978 | Randon et al. | 427/249 |
| 4,256,378 | 3/1981 | Prewo et al. | 350/310 |
| 4,314,852 | 2/1982 | Brennan et al. | 501/88 |
| 4,373,006 | 2/1983 | Galasso et al. | 428/368 |
| 4,399,231 | 8/1982 | Prewo et al. | 501/32 |
| 4,410,635 | 10/1983 | Brennan et al. | 501/88 |

Primary Examiner—John K. Corbin
Assistant Examiner—Richard Gallivan
Attorney, Agent, or Firm—A. Dean Olson

[57] ABSTRACT

An improved mirror substrate, that is particularly adapted for use as a laser mirror, has significantly improved transverse strength and polishability and a method of making the same. The composite comprises graphite fibers coated with an oxidized silicon carbide layer. The coated fibers alternate with layers of glass to form a composite, preferably having a central plane of symmetry across its central plane.

14 Claims, 3 Drawing Figures

COMPOSITE MIRROR SUBSTRATE

DESCRIPTION

1. Technical Field

The field of art to which this invention pertains is composite optical elements of the reflecting type.

2. Background Art

Because of the many peculiar physical property requirements of laser mirrors, both a variety of materials and designs have been employed in attempts to optimize the particular properties necessary for a composite used in this particular environment (U.S. Pat. Nos. 3,836,236; 3,926,510; 3,942,880). For example, a laser mirror in this environment must not only have the requisite reflective properties but should be a relatively simple structure to permit rapid fabrication both for time and cost purposes. Such mirrors should also desirably have low density to facilitate use in the types of apparatus where they will be utilized. Furthermore, such mirrors should ideally have high elastic stiffness and high strength along with high fracture toughness. Also stability is of the utmost importance both from the point of view of the fine resolution-type work environment the mirrors will be used in, and the inaccessibility of the apparatus which these mirrors would be used in, for example outer space applications. These stability properties include low thermal expansion, high thermal conductivity and environmental stability. Environmental stability includes such things as dimensional stability and mirror integrity regardless of moisture conditions, vaccum conditions, or ultraviolet light exposure, and mirror integrity and dimensional stability at both high and low temperatures.

This field of art has seen improvements, i.e., U.S. Pat. No. 4,256,378, over the highly polished metal block or graphite reinforced resin matrix composite type mirrors. Those mirror types usually required a myriad of complicated designs to compensate for the defects relating to the above-cited property areas. For example the popular use of resins in conventional composites of the above type inherently suffer from dimensional changes due to absorption or desorption of moisture, evolution of organic constituents due to prolonged exposure to high vacuum, breakdown due to prolonged exposure to UV radiation, low thermal conductivity, high coefficients of thermal expansion and a rapid decrease in integrity when used above 300° C.

While U.S. Pat. No. 4,256,378 is directed at laser mirrors, the use of such mirror substrates in the reflection of other wavelengths is also disclosed. Although the graphite fiber/glass matrix laser mirror in U.S. Pat. No. 4,256,378 represents a significant advancement in this art, there is always room for improvement. For example, the transverse strength of such composites can be relatively low and therefore can limit the strength of attachments and joints. Second, during polishing operations, fibers can be pulled out of the glass matrix leaving behind grooves that impair the surface optical quality which can require a polishable coating.

Accordingly, there is a constant search in this art for enhanced mirror substrates with improved properties such as greater strength and superior polishability.

DISCLOSURE OF INVENTION

This invention is directed to an improvement over the substrates described in U.S. Pat. No. 4,256,378 and other pertinent art which teach a temperature stable mirror comprising graphite fibers in a glass matrix. Mirror substrates containing reinforcing graphite fibers having an oxidized coating of SiC are described. The thus-coated fibers provide a mirror substrate having at least twice the transverse strength of a graphite/glass composite with uncoated fibers.

Another aspect of this invention is an improved laser mirror containing a graphite fiberglass matrix substrate and a laser radiation reflection outer layer. The graphite fiberglass matrix contains 40%–70% by volume graphite fibers, is balanced, and has a central plane of symmetry across the central plane of the composite. The improvement comprises using graphite fibers coated with an oxidized silicon carbide coating for the graphite fiber reinforcement resulting in a laser mirror having a transverse strength at least twice that of a laser mirror reinforced with uncoated graphite fibers.

It is another object of this invention to provide a process for producing the disclosed mirror substrate. Graphite fibers are provided with a SiC layer. The SiC coated graphite fibers are heated to oxidize the coating resulting in a mirror substrate with at least twice the transverse strength of a graphite/glass composite with uncoated fibers. The substrate is made by placing glass impregnated layers of fibers in a die and hot pressing at elevated temperatures to form a composite, preferably having a central plane of symmetry across its central plane.

This invention improves the fiber-matrix adhesion present in the prior art, resulting in mirrors of improved strength and polishability that retain the prior art's other desirable properties. It should be noted that while this disclosure is primarily directed to mirror substrates this composite would have utility in any structural application where composite materials with improved transverse strength are desirable.

The foregoing, and other features and advantages of the present invention, will become more apparent from the following paragraphs and accompanying drawings.

BEST MODE FOR CARRYING OUT THE INVENTION

While any graphite fiber with the requisite high strength and good modulus of elasticity can be used in the mirror substrates of this invention, such as Hercules HMS graphite fiber, Celanese GY-70 (formerly DG102) graphite fibers are particularly suitable. This fiber consists of 384 fibers/tow and has an oxidized finish. It is 8 microns in diameter, has a modulus of elasticity of 531 GPa $(77(10)^6$ psi). It has a tensile strength of 1724 MPa (250 ksi) and a density of 1.96 gm/cm$^3$. Typically, the fibers are from about 7 to about 15 microns in thickness and comprise 40% to 70% by volume of the glass matrix composite.

Figure 1:
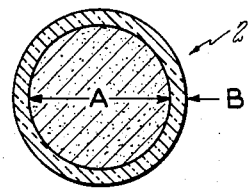
FIG. 1 demonstrates a cross-section of a typical oxidized silicon carbide coated carbon fiber.

The oxidized silicon carbide layer is at least about 0.12 micron in thickness but not so thick that the coating entirely fills the interfiber areas in the graphite fiber lay-up. See FIG. 1 where A represents the carbon fiber and B represents the oxidized silicon carbide layer. That is to say the oxidized silicon carbide must coat the individual fibers without bonding the fibers together. Preferably the silicon carbide coating is about 0.4 to about 4 microns in thickness and the oxide layer is about 200 to about 1000 Å in thickness prior to incorporation in the glass matrix. The layer thickness is described in terms of thickness prior to incorporation in the matrix since measurements after incorporation are extremely difficult if attainable. Since the fiber is envisioned as being primarily carbon, the oxidized silicon carbide thickness should preferably be limited so that it constitutes less than 50% of the cross section of the finished fiber.

Typically, the coating is achieved by conventional chemical vapor deposition although other processes will be known to those skilled in the art. The silicon carbide may be produced by a variety of conventional methods including the decomposition of various silanes like $Me_2SiCl_2$ and $MeHSiCl_2$ where Me is the methyl radical. The silane can be reacted with $CH_4$ and $H_2$ on the hot graphite surface to produce a thin continuous silicon carbide coating.

The silicon carbide coated graphite fiber is then heated to provide an oxidized silicon carbide layer. While not wanting to be held to any theory it is believed that the graphite fiber to glass matrix bond has generally been found to be the lowest strength microstructural feature of these composite materials. It is also believed that the layer of an oxidized silicon carbode coating is primarily responsible for improved fiber-matrix adhesion. Accordingly a conscious step is added to assure an oxidized silicon carbide thickness greater than what may naturally occur upon the usual exposure of silicon carbide to air. This layer is of a thickness so that the final mirror has a transverse strength of at least twice that of a mirror containing uncoated graphite fibers. The transverse strength is measured perpendicular to the fibers in the lay-up. The $SiO_2$ layer should be such that the ultimate mirror has a transverse strength preferably at least five times and most preferably at least ten times that of mirrors with uncoated fibers.

The silicon carbide coated fiber is preferably oxidized at 400°–700° C. At temperatures below 400° the oxide may not form fast enough and at temperatures above 700° the oxidation reaction may disturb the surface of the fiber. It is especially preferred that the oxidation temperature be maintained at 600°. The type of atmosphere the oxidation step can occur in will be readily apparent to those skilled in the art, i.e., flowing air. In a preferred process the oxidation step is achieved in an in-line process with the silicon carbide deposition step affording processing ease and cost efficiency. In that preferred process the fibers are coated with silicon carbide followed by an intermediate oxidation step, without any intermediate step, i.e. cooling.

The fibers of the present invention are suitable for incorporation into a variety of glass matrix composites. Exemplary glass matrix materials are sold by the Corning Glass Works under the names of fused silica (7940), Pyrex ® glass (7740) and Vycor ® glass (7930). Fused silica is substantially 100% silica. Pyrex glass is a lower melting glass containing nominally 82% silica, 12% $B_2O_3$, 4% $Na_2O$, and 2% Al. Vycor glass contains nominally 96% silica and 3% $B_2O_3$.

The glass used was particularly selected to have a very low coefficient of thermal expansion preferably matched closely, but not equal to that of the graphite fibers used since the graphite has a highly negative axial coefficient of thermal expansion and the glass has a positive but small coefficient of thermal expansion. Particularly suitable for the purposes of this invention is a borosilicate glass (CGW 7740) with an anneal point of 500° C., a softening point of 821° C., a liquidus temperature of 1017° C., a density of 2.23 grams per grams per cubic centimeter, an index of refraction of 1.474, a dielectric constant of 4.6, a coefficient of linear expansion of 32.5 cm/cm°C. $\times 10^{-7}$ and a modulus of elasticity of $9.1 \times 10^6$ psi. The particle size of the glass should be such that at least 90% passes through a 360 mesh screen.

A variety of methods may be used to produce the laser mirror of the present invention, including that described in commonly assigned U.S. Pat. No. 4,256,378, the disclosure of which is incorporated by reference. In that process fibers were passed through a slip of powdered glass, solvent and plasticizer to impregnate the fibers. The impregnated fibers are then rewound onto a larger rotating spool. An exemplary slip composition may be composed of 250 grams of powdered glass in 780 ml of propanol. An alternative composition may comprise 85 grams of the glass and 200 grams of propanol, 10 grams of polyvinyl alcohol and 5 drops (approx 1 cc) of a wetting agent, Tergitol ®. The receiving drum is preferably run at one revolution per minute or linear speed of five feet per minute. Excess glass and solvent can be removed by pressing a squeegy against the drum as it winds. Preferably the ground glass is sized so that 90% of it passes through a $-325$ mesh sieve. The thus impregnated tape is then dried either at ambient temperature or with a radiant heating source to remove solvent.

Figure 2:
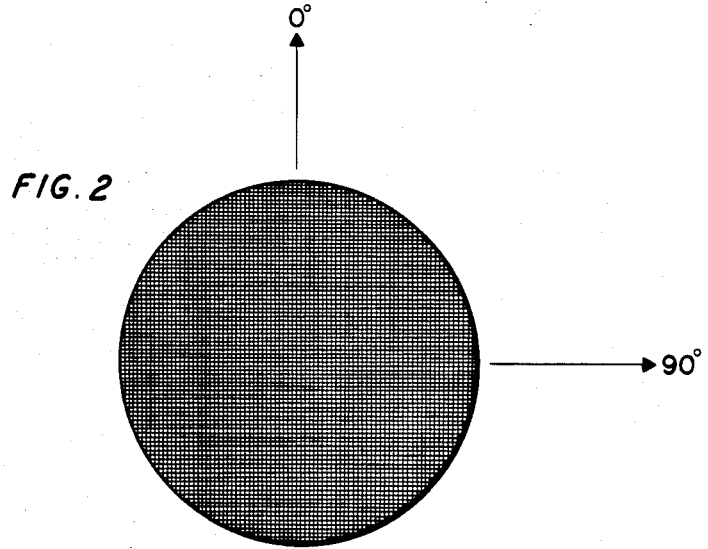
FIG. 2 demonstrates a typical 0°/90° cross-ply graphite fiber layup for the mirrors of the present invention.
Figure 3:
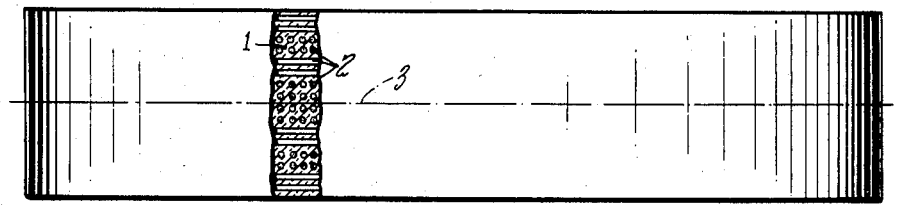
FIG. 3 demonstrates an end view of a finished mirror.

Following the impregnation the fiber is removed from the drum and cut into strips up to the diameter of the mirror to be fabricated. While the typical test samples made were about 10 cm in diameter, composite materials up to 20 cm in diameter have also been made by the processes of the present invention. However, composite materials of even larger diameters can be made according to the present invention. The fibers are then preferably laid in alternating ply stack-up sequence of 0 and 90° as illustrated by FIGS. 2 and 3. The assembled composite is then hot pressed, either under vacuum or inert gas such as argon, in metal dies coated with colloidal boron nitride, or graphite dies sprayed with boron nitride powder, at pressures of 6.9 to 13.8 MPa (1000–2000 psi) and temperatures of 2050°–1450° C. Additional glass in the form of powder may also be inserted between each layer as it is laid in an attempt to achieve a prefered 40–70% by volume loading of graphite fiber in the composite. Also, the mold can be vibrated to insure uniform distribution of the glass over the laid fiber surfaces.

It is important for obtaining the above-cited mirror properties that a central plane of symmetry be maintained across the central plane of the composite. Thus, while alternating 0° and 90° fiber laying was the most common test sample arrangement used, 0 ° and 45° ; 0°, 45° and 90° ; 0°, 30° and 90° ; 0° and 60° , etc., fiber laying can also be used as long as a central plane of symmetry is maintained. In fact, the 0°, 45° and 90° and 0° and 60° fiber laying give additional advantage of isotropy of elastic stiffness. By central plane of symmetry is meant that if the composite is sliced in half parallel to what will be the reflecting surface and perpendicular to the mirror's focal axis, each half will be a mirror image of the other half. Such symmetry especially affects the warpage characteristics of the composite. In addition, it is preferred that the ply lay-up sequence be balanced. By balanced it is meant that there are equal numbers of composite plies, and hence fibers, directed in each of the principal fiber directions chosen. Such balance affects the strength and modulus properties of the composite. This is specifically demonstrated by FIG. 3 which is the end view of a 0°/90° specimen where 1 indicates the glass matrix, 2 indicates the graphite fibers and 3 indicates the central plane of symmetry.

The finished mirror composite can be so molded as to provide the reflecting surface shape itself, e.g., by using a highly polished releasable mold surface. However, in use it may be necessary to provide the mirror composite with a separate reflecting surface. As the outermost reflective coating, any conventional reflective coating, in the infrared, visible, ultraviolet, laser, etc. range may be deposited. This can include such things as gold; gold, silver or aluminum overcoated with silicon oxide or magnesium fluoride; and multilayered dielectric coatings such as alternating layers of one quarter optical wavelength thickness of zinc sulfide and thorium tetrafluoride. In the laser mirror art there are a variety of coatings including, for example, a chromium-gold alloy. Such surface layers can be applied by conventional methods commonly used to deposit thin uniform layers (e.g., less than one mil) of such material such as spraying, vapor deposition and cathode sputtering.

The composite material can be used in any structural application where a higher transverse strength than that obtained from carbon glass is needed. It is particularly suited for laser mirrors where dimensional stability and structural strength are so important. But it would be within the purview of one skilled in the art to use the mirror substrate to reflect other wavelength of radiation such as optical light. For instance, it may be used in other aplications to advantage such as in a large reflecting telescope where the mere size of the aparatus creates great strain.

EXAMPLE

Carbon fibers sold under the trade name HTS by Hercules and having an average diameter of 8u were coated with silicon carbide by holding the fibers in a chamber through which a mixture of 31 cc/min methyldichlorosilane, 110/cc/min of $CH_4$, and 96 cc/min of $H_2$ were passed. The fibers were maintained at a temperature of between 1100° C. and 1200° C., by passing them through an R.F. heated graphite susceptor. Under these conditions, reaction times of from 5 to 30 minutes produced silicon carbide coating thickness in the range of about 0.1 micron to 4 microns. The silicon carbide coated fibers were then oxidized in air at 600° C. in an in-line process for about one hour. The oxidized silicon carbide graphite fibers were passed through a slip of 250 grams of the powdered glass in 780 ml of propanol. The powdered glass was sized so that 90% of it passes through a 325 mesh sieve. The impregnated fiber was run through the slip and onto a receiving drum at five feet/minutes and then dried with a radiant heating source to remove the solvent. The dried fiber was removed from the drum and cut into 10 cm strips. The fibers were then laid in alternating ply stack-up sequence of 0° and 90° as illustrated by FIGS. 2 and 3. The assembled composite was then hot pressed under vacuum in a metal die coated with colloidal boron nitride at a pressue of (1500 psi) and a temperature of 1250° C. After cooling the mirror sustrate was provided with a cladding, a 0.5 mil layer of chromium gold alloy vapor deposition. The resulting laser mirror had a transverse strength of 1000 psi in comparison to 80 psi for an uncoated graphite-glass composite.

As can be appreciated this material makes a significant contribution to this technology. The oxidized silicon carbide layer produces a mirror substrate having greatly improved fiber-matrix adhesion and ultimately a mirror material having both far superior transverse strength and improved polishability. The transverse strength of this material is at least twice that of an uncoated graphite glass composite (e.g., a transverse strength of at least 160 lb/in$^2$) and preferably at least five times that of an uncoated graphite glass composite (e.g., a transverse strength of at least 480 lb/in$^2$) and most preferbly at least ten times that of an uncoated glass composite (e.g., a transverse strength of at least 800 lb/in$^2$). This increases the strength of attachments and joints. In addition the dramatic increase in transverse strength greatly reduces the number of grooves that are formed during polishing operations as fibers are pulled out. Although laser mirrors require a coating, the ease with which this can be applied is greatly enhanced when it is coated on an even surface. A mirror made with oxidized SiC coated graphite fibers has an even surface after polishing in contrast to a mirror material made with uncoated graphite fibers. This affords a superior coating process.

This discovery improves the mirror substrate in U.S. Pat. No. 4,256,378 and other pertinent art which have high thermal conductivity and desirable thermal expansion characteristics. It significantly increases its strength and improves its polishability to provide a dimensionally stable mirror at both high and low temperatures.

It will be understood that the foregoing description and drawings are only illustrative of the present invention and it is not intended that the invention be limited thereto. Many other specific embodiments of the present invention will be obvious to one skilled in the art in view of this disclosure. All substitutions, alterations and modifications of the present invention which come within the scope of the following claims or to which the present invention is readily susceptible without departing from the spirit and scope of this disclosure are considered part of the present invention.

We claim:

1. A high strength, high temperature stable mirror substrate comprising a glass matrix material reinforced with graphite fibers wherein the improvement comprises:
   (a) utilizing as the graphite fiber reinforcement, graphite fibers having a layer of an oxidized silicon carbide coating thereon, resulting in a mirror substrate having a transverse strength at least twice that of the glass matrix reinforced with uncoated graphite fibers.

2. A mirror substrate as recited in claim 1 wherein the transverse strength is at least five times that of the glass matrix reinforced with uncoated grphite fibers.

3. A mirror substrate as recited in claim 1 wherein the transverse strength is at least ten times that of the glass matrix reinforced with uncoated graphite fibers.

4. An improved mirror substrate as recited in claim 1 wherein the thickness of the oxidized silicon carbide coating is about 0.42 micron to about 4.1 microns prior to incorporation into the matrix.

5. An improved laser mirror comprising a graphite fiber glass matrix composite containing 40% to 70% by volume graphite fibers, having a laser radiation reflecting outer layer and having a graphite fiber lay-up in the glass matrix producing balance and a central plane of symmetry across the central plane of the composite wherein the improvement comprises utilizing as the graphite fiber reinforcement, graphite fibers having a layer of an oxidized silicon carbide coating thereon, resulting in a mirror substrate having a transverse strength at least twice that of the glass matrix reinforced with uncoated graphite fibers.

6. An improved laser mirror as recited in claim 5 wherein the transverse strength is at least five times that of the glass matrix reinforced with uncoated graphite fibers.

7. An improved laser mirror as recited in claim 5 wherein the transverse strength is at least ten times that of the glass matrix reinforced with uncoated graphite fibers.

8. An improved laser mirror as recited in claim 5 wherein the thickness of the oxidized silicon carbide coating is about 0.42 micron to about 4.1 microns prior to incorporation into the matrix.

9. A process for producing an improved graphite-glass mirror substrate by impregnating reinforcing graphite fibers with a glass slurry, stacking layers of the glass impregnated fibers in a die to produce a symmetrical composite, and hot pressing the composite wherein the improvement comprises:

(a) coating the reinforcing carbon fibers, prior to impregnation with the glass slurry, with a layer of silicon carbide;

(b) heating the silicon carbide coated graphite fiber to oxidize the coating;

resulting in a mirror substrate with transverse strength at least twice that of the graphite-glass substrate reinforced with uncoated graphite fibers.

10. A process for producing a mirror substrate as recited in claim 9 wherein the layer of silicon carbide comprises up to 50% of the cross section of the fiber coated with silicon carbide.

11. A process for producing a mirror substrate as recited in claim 9 wherein the oxidation is done in an in-line process with the coating step.

12. A process for producing a mirror substrate as recited in claim 9 wherein the silicon carbide layer is about 0.4 micron to about 4 microns in thickness and the oxidized layer is about 200 Å to about 1000 Å in thickness prior to incorporation in the matrix.

13. A process for producing a mirror substrate as recited in claim 9 wherein the heating to oxidize is done at 400°–700° C.

14. A process for producing a mirror substrate as recited in claim 9 wherein the heating to oxidize is done at 600° C.

* * * * *